(12) United States Patent  (10) Patent No.: US 7,969,628 B2
Kim et al.  (45) Date of Patent: Jun. 28, 2011

(54) APPARATUS AND METHOD FOR SEGMENTING AN OUTPUT DEVICE COLOR GAMUT AND MAPPING AN INPUT DEVICE COLOR GAMUT TO THE SEGMENTED OUTPUT DEVICE COLOR GAMUT

(75) Inventors: Yun-tae Kim, Yongin-si (KR); You-sun Bang, Yongin-si (KR); Heui-keun Choh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1140 days.

(21) Appl. No.: 11/699,403

(22) Filed: Jan. 30, 2007

(65) Prior Publication Data

US 2007/0188786 A1  Aug. 16, 2007

(30) Foreign Application Priority Data

Feb. 10, 2006 (KR) ........................ 10-2006-0013266

(51) Int. Cl.
  *G03F 3/08* (2006.01)
  *G06K 9/00* (2006.01)
(52) U.S. Cl. ........ 358/518; 358/520; 358/521; 358/523; 382/167
(58) Field of Classification Search .................. 358/518, 358/520, 521, 523; 382/167
  See application file for complete search history.

(56) References Cited

U.S. PATENT DOCUMENTS

| 5,185,661 | A | * | 2/1993 | Ng | 358/505 |
|---|---|---|---|---|---|
| 5,583,666 | A | * | 12/1996 | Ellson et al. | 358/518 |
| 5,712,925 | A | * | 1/1998 | Ohga | 382/167 |
| 5,933,252 | A | * | 8/1999 | Emori et al. | 358/500 |
| 6,041,136 | A | * | 3/2000 | Ohga | 382/162 |
| 6,268,930 | B1 | * | 7/2001 | Ohta et al. | 358/1.9 |
| 6,373,595 | B1 | * | 4/2002 | Semba et al. | 358/1.9 |
| 6,748,106 | B1 | | 6/2004 | Bryant et al. | |
| 6,850,342 | B2 | | 2/2005 | Woolfe et al. | |
| 7,557,814 | B2 | * | 7/2009 | Tin | 345/590 |
| 2002/0149786 | A1 | * | 10/2002 | Hudson et al. | 358/1.9 |
| 2005/0024652 | A1 | * | 2/2005 | Gondek | 358/1.9 |
| 2005/0047654 | A1 | * | 3/2005 | Newman et al. | 382/167 |
| 2005/0152612 | A1 | * | 7/2005 | Spaulding et al. | 382/254 |
| 2007/0085855 | A1 | * | 4/2007 | Tin | 345/590 |
| 2007/0091337 | A1 | * | 4/2007 | Morovic | 358/1.9 |

FOREIGN PATENT DOCUMENTS

JP  2005-57767 A  3/2005

OTHER PUBLICATIONS

"A Topographic Gamut Compression Algorithm", L. MacDonald, J. Morovic & K. Xiao, Journal of Imaging Science and Technology, vol. 46, No. 3, May/Jun. 2002, p. 228-236.*

* cited by examiner

*Primary Examiner* — King Y Poon
*Assistant Examiner* — Vincent R Peren
(74) *Attorney, Agent, or Firm* — Sughrue Mion, PLLC

(57) ABSTRACT

A gamut mapping apparatus includes a parameter calculating unit calculating parameters for segmenting a gamut of an output device using gamut information about first and second input color spaces; a gamut segmenting unit segmenting the gamut of the output device into a core gamut and a surround gamut using the parameters; and a gamut mapping unit performing gamut mapping on image data present into the first and second input color spaces to the core gamut and the surround gamut according to a predetermined mapping method. The gamut mapping apparatus and method enable accurate reproduction of image data having components having undergone total internal reflection falling outside the scRGB color space or high chroma components in the scRGB color space.

16 Claims, 6 Drawing Sheets

APPARATUS AND METHOD FOR SEGMENTING AN OUTPUT DEVICE COLOR GAMUT AND MAPPING AN INPUT DEVICE COLOR GAMUT TO THE SEGMENTED OUTPUT DEVICE COLOR GAMUT

CROSS-REFERENCE TO RELATED APPLICATION

This application is based on and claims priority from Korean Patent Application No. 10-2006-0013266, filed on Feb. 10, 2006 in the Korean Intellectual Property Office, the disclosure of which is incorporated herein in its entirety by reference.

BACKGROUND OF THE INVENTION

1. Field of the Invention

The present invention relates to a gamut mapping apparatus and method, and more particularly, to a gamut mapping apparatus and method, by which input image data of a wide gamut can be reproduced as image data of a gamut of an output device without distortion by segmenting the gamut of the output device into a core gamut and a surround gamut.

2. Description of the Related Art

To meet gradually increasing user's desire for digital image apparatuses with a variety of functions and high quality performances, such as monitors, scanners, printers and so on, such digital image apparatuses adopt different color spaces or color models depending on fields of the application.

A color model is classified into a device-dependent model and a device-independent model. Typical device-gamut dependent color spaces include an additive color space model such as RGB(Red Green Blue) and a subtractive color space model such as CMYK(Cyan Magenta Yellow Black). Exemplary device-independent color models include CIE L*a*b, CIE XYZ, and CIE LUV. The CIE L*a*b color model is set by the International Commission on Illumination (ICI), which defines lighting standards. The CIEXYZ color model expresses RGB values as a set, X, Y, Z, of different values, all having positive signs. Generally, the X, Y, Z values are referred to as tri-stimulus.

To reproduce input image data of a wide gamut in an output device for outputting narrow gamut image data without distortion, gamut mapping is needed. There have been numerous known techniques of gamut mapping.

First, there has been proposed a gamut mapping method using a look-up table (LUT). According to the proposed method, a LUT for a narrow gamut is previously generated and a LUT for a wide gamut is then generated from the LUT for narrow gamut using interpolation. Thus, it is difficult to achieve accurate gamut mapping from the narrow and wide gamuts to a gamut of an output device.

Another known gamut mapping method is to use a color adjust function, in which gamut compression is performed throughout a gamut of an output device without segmenting the gamut. Thus, it is difficult to accurately reproduce remaining gamut data, excluding a portion corresponding to a narrow gamut of the output device from a wide gamut of an input image.

SUMMARY OF THE INVENTION

Illustrative, non-limiting exemplary embodiments of the present invention overcome the above disadvantages, as well as other disadvantages not described above.

To solve the above-described problems, it is an object of the present invention to provide a gamut mapping apparatus and method, by which input image data of a wide gamut can be reproduced as image data of a gamut of an output device without distortion by separately segmenting the gamut of the output device into a core gamut and a surround gamut.

The above and other objects of the present invention will be described in, or be apparent from, the following description of exemplary embodiments.

An apparatus consistent with the present invention provides a gamut mapping apparatus including a parameter calculating unit calculating parameters for segmenting a gamut of an output device using gamut information about first and second input color spaces; a gamut segmenting unit segmenting the gamut of the output device into a core gamut and a surround gamut using the parameters; and a gamut mapping unit performing gamut mapping on image data present into the first and second input color spaces to the core gamut and the surround gamut according to a predetermined mapping method.

Also, an apparatus consistent with the present invention provides a color mapping method including calculating parameters for segmenting a gamut of an output device using gamut information about first and second input color spaces; segmenting the gamut of the output device into a core gamut and a surround gamut using the parameters, and performing gamut mapping on image data present into the first and second input color spaces to the core gamut and the surround gamut according to a predetermined mapping method.

BRIEF DESCRIPTION OF THE DRAWINGS

The above objects and advantages of the present invention will become more apparent by describing in detail exemplary embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, gamut mapping apparatuses and methods according to exemplary embodiments of the present invention with reference to block diagrams and flowchart illustrations will be described.

Figure 1:
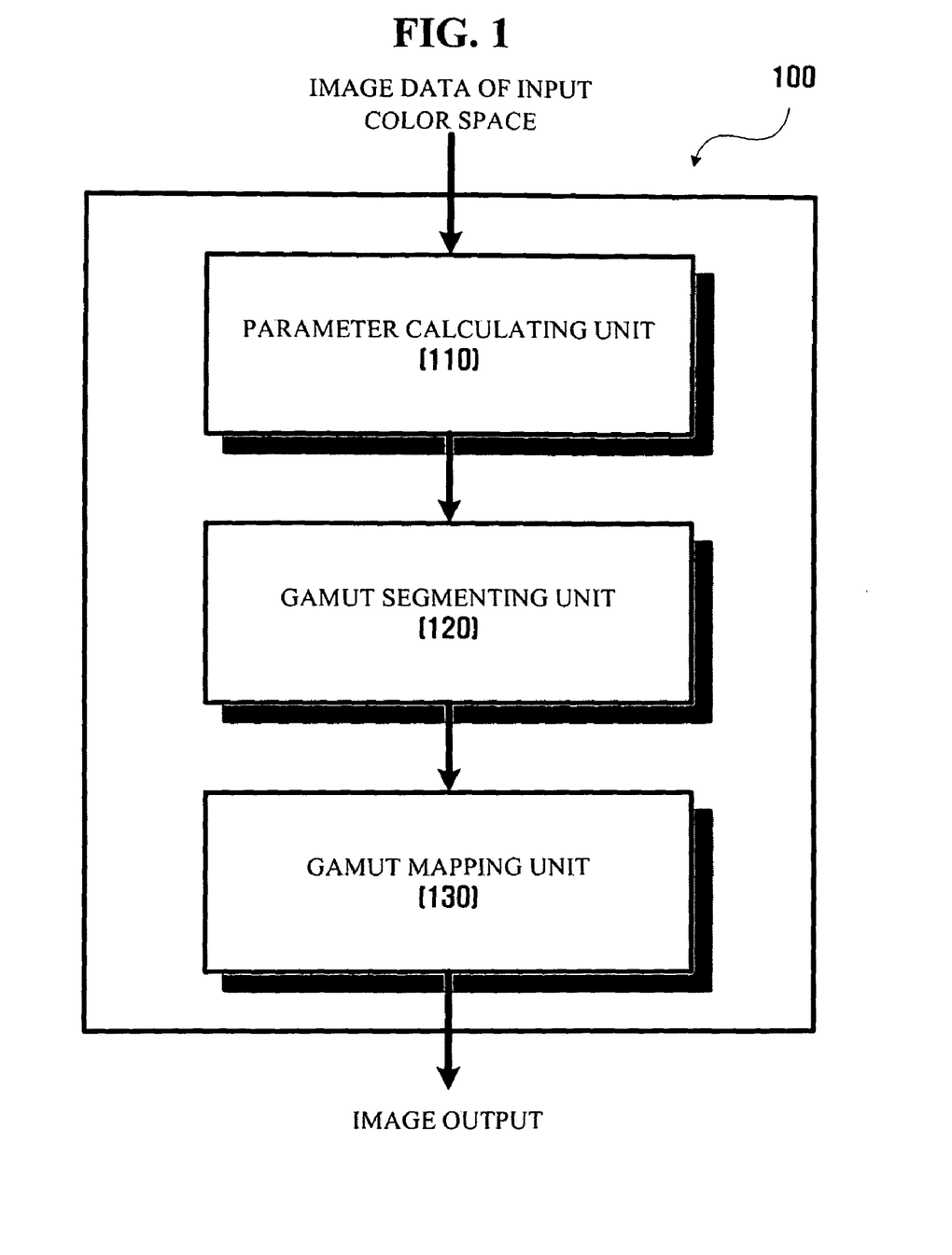
FIG. 1 is a block diagram showing a gamut mapping apparatus according to an exemplary embodiment of the present invention.

FIG. 1 is a block diagram showing a gamut mapping apparatus 100 according to an exemplary embodiment of the present invention. Referring to FIG. 1, the gamut mapping apparatus 100 includes a parameter calculating unit 110, a gamut segmenting unit 120 and a gamut mapping unit 130.

The parameter calculating unit 110 calculates parameters for segmenting a gamut of an output device using gamut information about first and second input colors. Here, the term "gamut" generally is used to describe the complete range of colors that can be produced or represented by the gamut mapping.

While the input color spaces are not limited to particular color models in this exemplary embodiment of the present invention, the following description of the invention will be made with regard to an additive color model, e.g., a RGB color model, by way of example. In addition, in order to set the first input color space to be included in the second input color space, an explanation will be made with regard to a case where the first input color space and the second input color space are replaced with a sRGB color space and a scRGB color space, respectively.

The parameters calculated by the parameter calculating unit 110 can be set in two possible embodiments according to the gamut segmentation types of the output device. In the first embodiment, the parameters are calculated using a ratio of the gamut distribution profile in the scRGB color space to the gamut distribution profile in the sRGB color space. In the second embodiment, the parameters are calculated using a ratio of the number of pixels of input image data inside the scRGB color space to the number of pixels of input image data inside the sRGB color space.

Figure 2A:
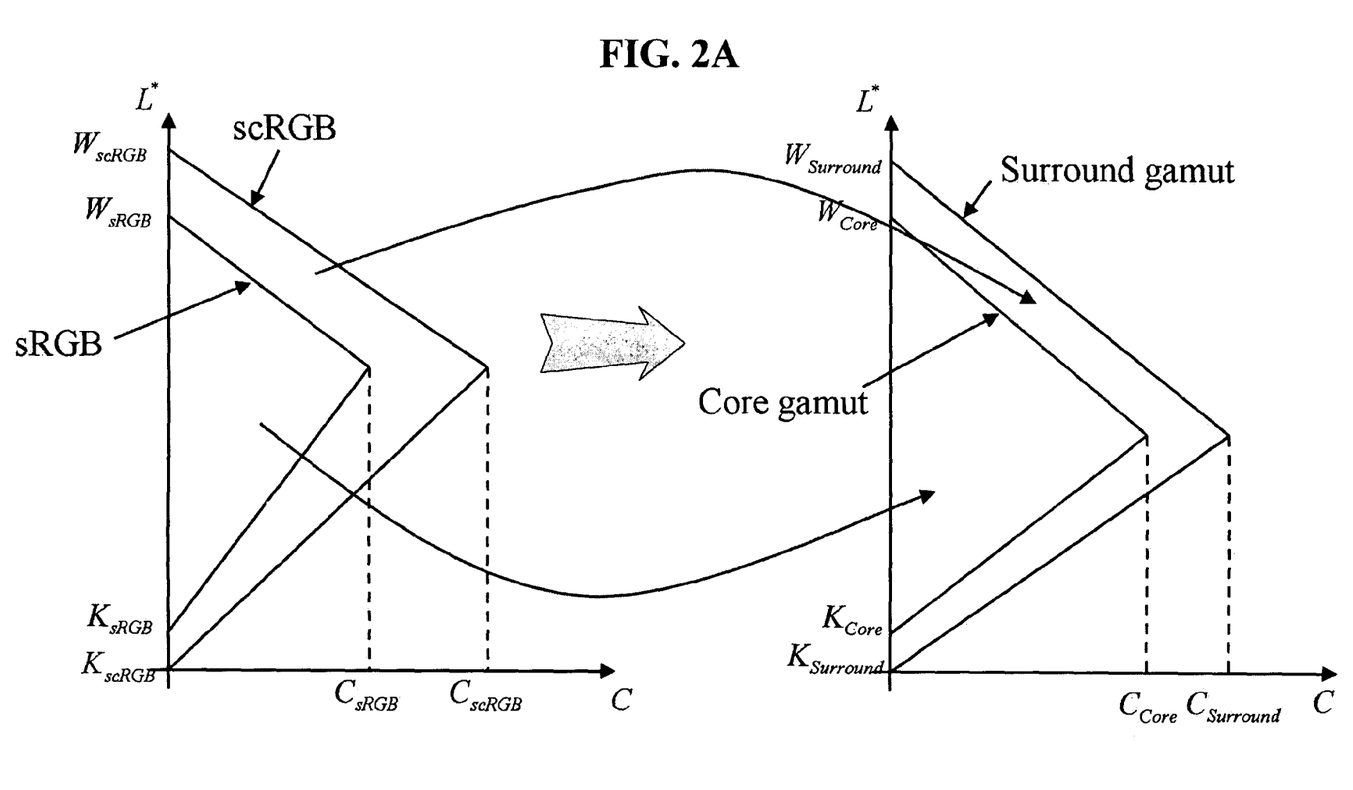
FIG. 2A is a graphical representation describing a procedure of performing gamut mapping according to a first exemplary embodiment of the present invention.
Figure 2B:
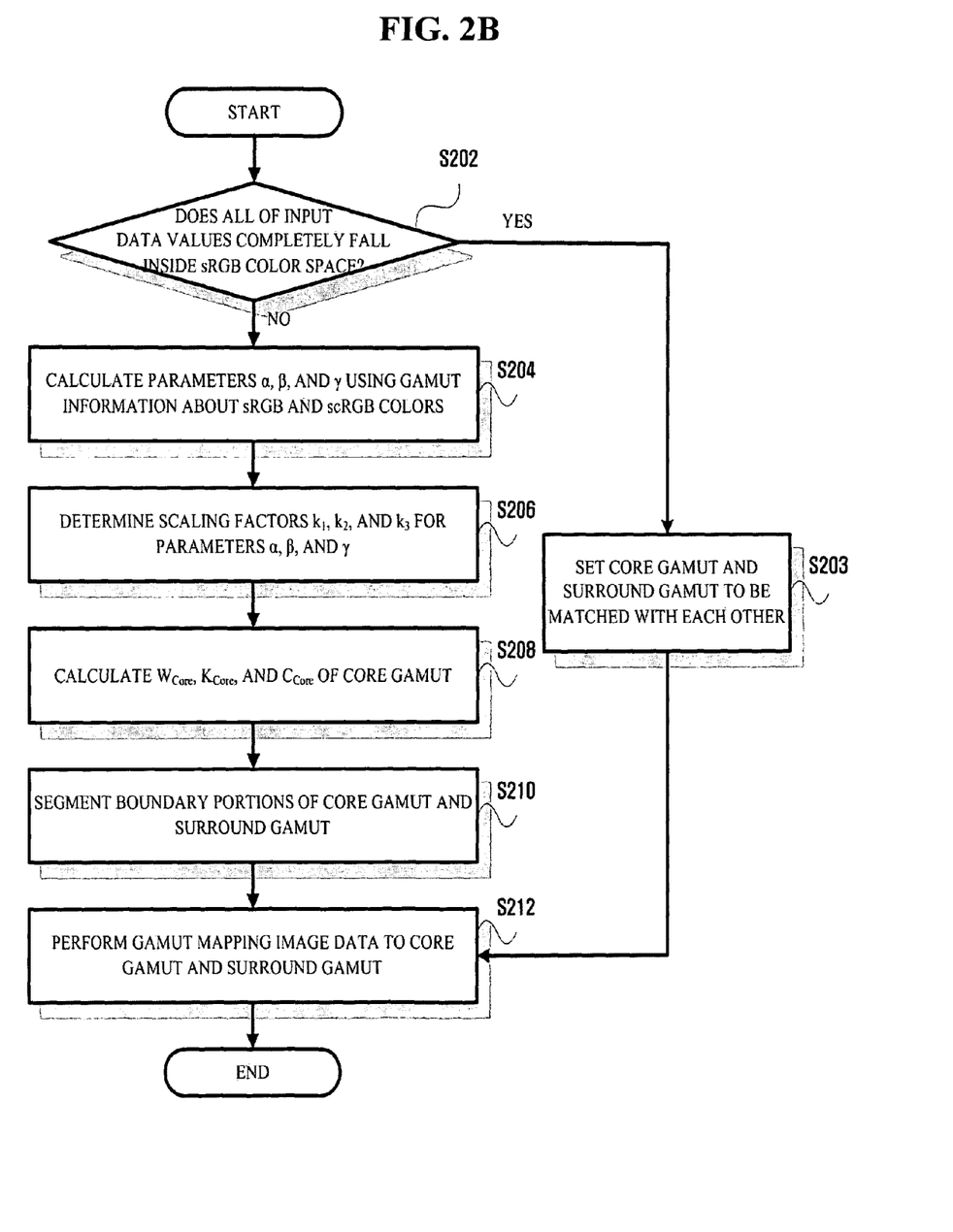
FIG. 2B is a flowchart of the procedure of performing gamut mapping shown in FIG. 2A.

The first exemplary embodiment of the invention will be described with reference to FIGS. 2A and 2B. FIG. 2A is a graphical representation describing a procedure of performing gamut mapping according to a first exemplary embodiment of the present invention, and FIG. 2B is a flowchart of the procedure of performing gamut mapping shown in FIG. 2A.

In the left graph shown in FIG. 2A illustrating an input color space, the vertical axis indicates lightness L*, and the horizontal axis indicates chroma C (or saturation). The sRGB color space and the scRGB color space are also illustrated in the left graph shown in FIG. 2A. $W_{scRGB}$ and $K_{scRGB}$ of the vertical axis denote a maximum lightness level (white) and a minimum lightness level (black) in the scRGB color space, respectively. $W_{sRGB}$ and $K_{sRGB}$ of the vertical axis denote a maximum lightness level (white) and a minimum lightness level (black) in the sRGB color space, respectively. $C_{scRGB}$ and $C_{sRGB}$ of the horizontal axis denote a maximum chroma level (Cusp) and a minimum chroma level (Cusp) in the scRGB color space and the sRGB color space, respectively.

The parameter calculating unit 10 calculates α, β, and γ for segmenting a gamut of an output device using a ratio of the gamut distribution profile in the sRGB color space to the gamut distribution profile in the scRGB color space, as indicated by the left graph shown in FIG. 2A.

Here, α, β, and γ are defined by Equations $$\alpha = \frac{W_{scRGB} - W_{sRGB}}{W_{scRGB} - K_{scRGB}},$$

-continued $$\beta = \frac{K_{sRGB} - K_{scRGB}}{W_{scRGB} - K_{scRGB}}, \text{ and}$$

$$\gamma = \frac{C_{sRGB}}{C_{scRGB}},$$

wherein $W_{sRGB}$, $K_{sRGB}$, and $C_{sRGB}$ denote a maximum lightness level, a minimum lightness level, and a maximum chroma level, of the first color space, respectively.

The gamut segmenting unit 120 segments the gamut of the output device into a core gamut and a surround gamut using the calculated parameters, which will now be described with reference to the right graph show in FIG. 2A. In the right graph shown in FIG. 2A illustrating an output color space, the vertical and horizontal axes indicate lightness L*, and chroma C (or saturation), like in the left graph shown in FIG. 2A. The gamut segmented into the core gamut and the surround gamut is also illustrated in the right graph shown in FIG. 2A.

$W_{surround}$ and $K_{surround}$ of the vertical axis denote a maximum lightness level (white) and a minimum lightness level (black) in the gamut in the surrounding color, respectively. $W_{Core}$ and $K_{Core}$ of the vertical axis denote a maximum lightness level (white) and a minimum lightness level (black) in the gamut in the core color, respectively. $C_{Core}$ and $C_{surround}$ of the horizontal axis denote a maximum chroma level (Cusp) and a minimum chroma level (Cusp) in the gamut in the core color and the gamut in the surrounding color, respectively. The $W_{Core}$, $K_{Core}$, and $C_{Core}$ are calculated by the gamut segmenting unit 120 using the calculated parameters.

In other words, $W_{Core}$ and $K_{Core}$ indicating the maximum lightness level (white) and the minimum lightness level (black) in the gamut in the core color are defined by Equations $W_{Core} = W_{Surround} - \alpha k_1 (W_{Surround} - K_{Surround})$, and $K_{Core} = K_{Surround} + \beta k_2 (W_{Surround} - K_{Surround})$. $C_{Core}$ is defined by Equation $C_{Core} = \gamma k_3 C_{Surround}$. In such a manner, the gamut of the output device is segmented into the core gamut and the surround gamut. Here, $k_1$, $k_2$, and $k_3$ are proportional constants which are scaling factors for α, β, and γ.

After setting the boundary by segmenting the gamut of the output device, the gamut mapping unit 130 performs gamut mapping on image data present on the input color spaces, i.e., the scRGB color space and the sRGB color space, to the core gamut and the surround gamut according to the above-described method.

Gamut mapping is performed for the purpose of adjusting two different color gamuts. For example, when input image data from a large-sized gamut is reproduced in an output device whose gamut is smaller than the color gamut of an input device, colors falling outside the gamut of the output device may not be properly reproduced. Accordingly, when an input color signal has a different gamut from that of a color reproducing apparatus, a gamut mapping technique that converts input image data into an adequate form that can be matched with the gamut of the color reproducing apparatus is required. Such a converting process is a gamut mapping process. There are several types of general gamut mapping, which will now be described.

First, cusp mapping is used when there is a large difference between a cusp point from a source gamut and a cusp point from a destination gamut. According to the cusp mapping, source data is mapped to the destination gamut in a direction in which the cusp point from the source gamut is the same as that from the destination gamut. Here, the term 'cusp' means a maximum chroma level.

Second, clipping mapping is used when there is a small difference between a cusp point from a source gamut and a cusp point from a destination gamut. This technique is particularly used when the destination gamut completely falls inside the source gamut. According to the clipping mapping, data present outside the destination gamut falling within the source gamut is mapped to a boundary portion of the destination gamut.

Third, extension mapping is also used when there is a small difference between a cusp point from a source gamut and a cusp point from a destination gamut. This technique is particularly used when the source gamut completely falls inside the destination gamut. Data of the source gamut completely falling within the destination gamut, which is contrary to a case of the clipping mapping, is mapped to a boundary portion of the destination gamut using a proportion of the source gamut boundary to the destination gamut boundary.

As shown in FIG. 2A, the gamut mapping unit 130 performs gamut mapping on the image data present inside the sRGB color space to the core gamut. In addition, the gamut mapping unit 130 performs gamut mapping on the image data present outside the sRGB color space and inside the scRGB color space to the surround gamut.

However, in a case where the input image data falls in the sRGB color space, since it is not necessary to segment the gamut of the output device, the gamut segmenting unit 120 sets the core gamut and the surround gamut of the output device to be matched to each other. The gamut mapping unit 130 performs gamut mapping on the input image data to the matched gamut (that is, the core gamut or the surround gamut) of the output device.

The procedure according to the first exemplary embodiment will now be described in greater detail with reference to FIG. 2B.

In operation S202, it is determined whether all of input image data values fall within the sRGB color space or not. If all of input image data values fall within the sRGB color space, the core gamut and the surround gamut of the output device are set to be matched to each other in operation S203. Then, mapping to the matched gamut is performed in operation S212.

If all of input image data values do not fall within the sRGB color space, parameters α, β, and γ for segmenting the gamut of the output device are calculated in operation S204. Next, scaling factors $k_1$, $k_2$, and $k_3$ for α, β, and γ are determined in operation S206. In operation S208, $W_{Core}$, which is a maximum lightness level (white) in the gamut of the output device, $K_{Core}$, which is a minimum lightness level (black) in the gamut of the output device, and $C_{Core}$, which is a maximum chroma level (Cusp), are calculated based on the above stated equations using the calculated parameters α, β, and γ and the corresponding scaling factors $k_1$, $k_2$, and $k_3$. In operation S210, the core gamut and the surround gamut of the output device are segmented using the calculated scaling factors. Then, gamut mapping is performed on the image data present inside the sRGB input color space and the image data present outside the scRGB color space and inside the sRGB color space to the core gamut and the surround gamut, respectively, in operation S212.

Figure 3A:
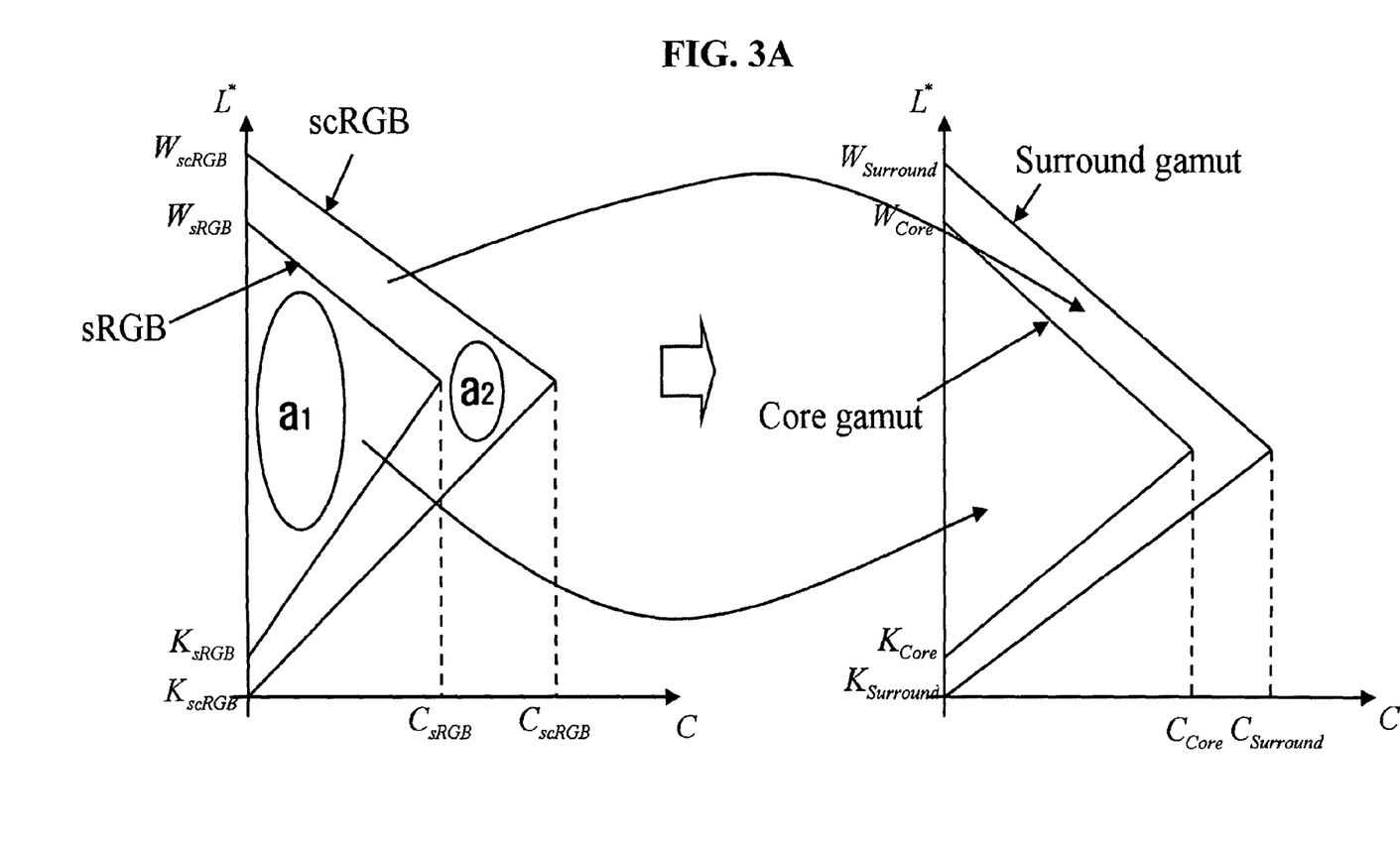
FIG. 3A is a graphical representation describing a procedure of performing gamut mapping according to a second exemplary embodiment of the present invention.
Figure 3B:
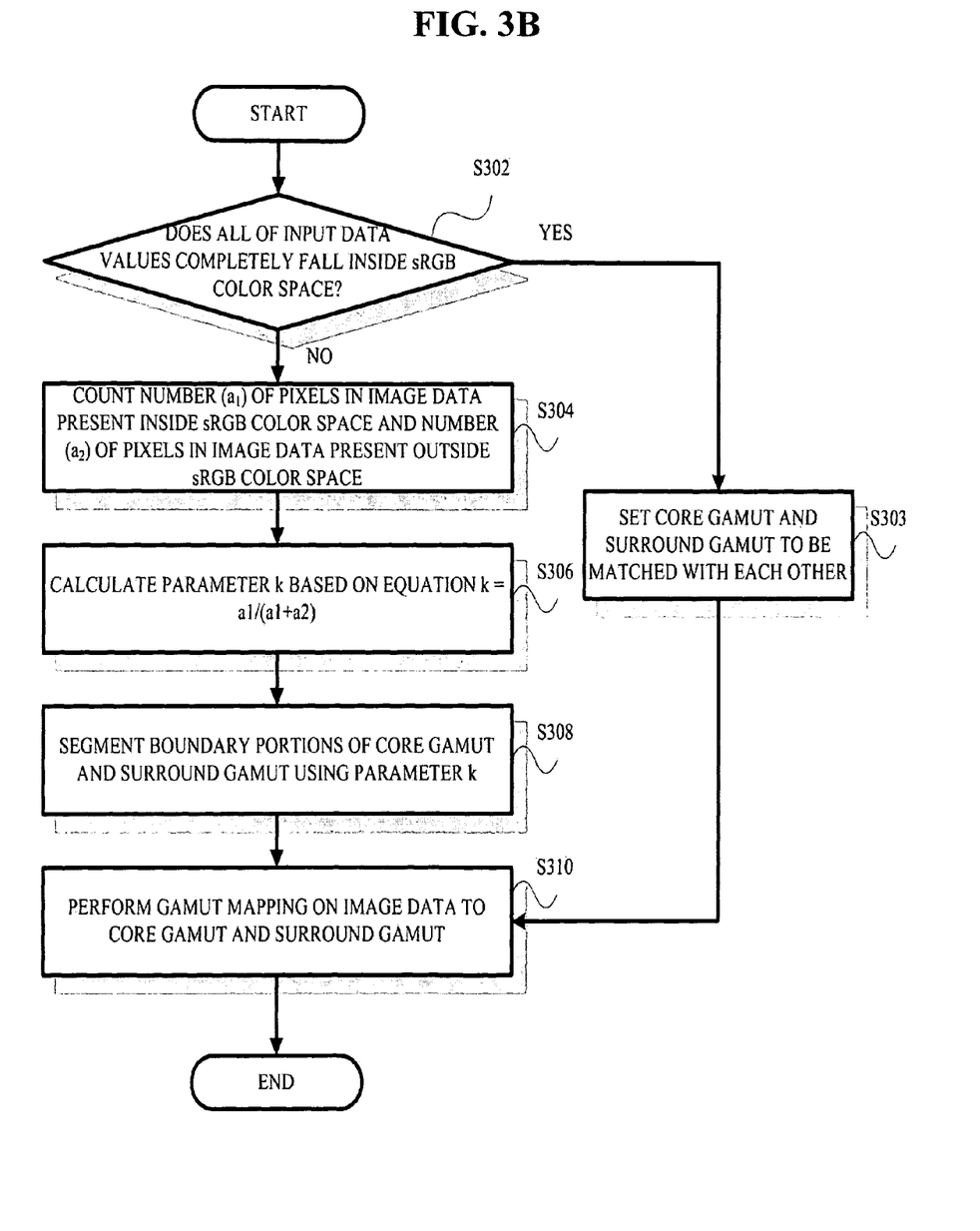
FIG. 3B is a flowchart of the procedure of performing gamut mapping shown in FIG. 3A.

The procedure according to the second exemplary embodiment will now be described with reference to FIGS. 3A and 3B. FIG. 3A is a graphical representation describing a procedure of performing gamut mapping according to the second exemplary embodiment of the present invention, and FIG. 3B is a flowchart of the procedure of performing gamut mapping shown in FIG. 3A.

Referring to FIG. 3A, the vertical axis indicates lightness L*, and the horizontal axis indicates chroma C (or saturation), which is the same as in FIG. 2A. In the left graph shown in FIG. 3A, $W_{scRGB}$, $K_{scRGB}$, $W_{sRGB}$, and $K_{sRGB}$ of the vertical axis, and $C_{scRGB}$ and $C_{sRGB}$ of the horizontal axis denote the same concepts as in FIG. 2A. In the right graph shown in FIG. 3A, $W_{surround}$, $K_{surround}$, $W_{Core}$ and $K_{Core}$ of the vertical axis and $C_{Core}$ and $C_{surround}$ of the horizontal axis denote the same concepts as in FIG. 2A.

Here, the parameter calculating unit 110 calculates a parameter k using a ratio of a number $a_1$ of pixels in input image data present inside the sRGB color space to a number $a_1+a_2$ of pixels in input image data present inside the scRGB color space, as expressed by $$k = \frac{a_1}{a_1 + a_2},$$

wherein $a_1$ indicates a number of pixels in input image data present inside the sRGB color space, and $a_2$ indicates a number of pixels in input image data present outside the sRGB color space and inside the scRGB color space.

The gamut segmenting unit 120 segments the gamut of the output device into a core gamut and a surround gamut using the calculated parameter k, like in the first exemplary embodiment. In other words, $W_{Core}$ and $K_{Core}$ indicating the maximum lightness level (white) and the minimum lightness level (black) in the gamut in the core color are defined by Equations $W_{Core}=kW_{Surround}$ and $K_{Core}=kK_{Surround}$. In addition, $C_{Core}$ is defined by Equation $C_{Core}=kC_{Surround}$.

In such a manner, the gamut of the output device is segmented into the core gamut and the surround gamut to setting the boundary line, and the gamut mapping unit 130 performs gamut mapping on the input image data to the segmented gamuts, (that is, the core gamut or the surround gamut) of the output device, which is the same as in the first exemplary embodiment.

As to the gamut mapping, like in the first exemplary embodiment, the gamut mapping unit 130 performs gamut mapping on the image data present inside the sRGB color space to the core gamut. In addition, the gamut mapping unit 130 performs gamut mapping on the image data present outside the sRGB color space and inside the scRGB color space to the surround gamut.

However, in a case where the input image data falls in the sRGB color space, it is not necessary to segment the gamut of the output device, unlike in the previous exemplary embodiment. Thus, the gamut segmenting unit 120 sets the core gamut and the surround gamut of the output device to be matched to each other. The gamut mapping unit 130 performs gamut mapping on the input image data to the matched gamut (that is, the core gamut or the surround gamut) of the output device.

The procedure according to the second exemplary embodiment will now be described in greater detail with reference to FIG. 3B.

In operation S302, like in the first exemplary embodiment, it is determined whether all of input image data values fall within the sRGB color space or not. If all of input image data values fall within the sRGB color space, the core gamut and the surround gamut of the output device are set to be matched to each other in operation S303. Then, mapping to the matched gamut is performed in operation S310.

If all of input image data values do not fall within the sRGB color space, prior to segmentation of the gamut of the output device, a number $a_1$ of pixels in input image data present inside the sRGB color space and a number $a_2$ of pixels in input image data present outside the sRGB color space and inside the scRGB color space are counted in operation S304. A scaling factor k is calculated using the counted numbers of pixels, as expressed by $k=a_1/(a_1+a_2)$ in operation S306.

In operation S308, $W_{Core}$, which is a maximum lightness level (white) in the core gamut of the output device, $K_{Core}$, which is a minimum lightness level (black) in the core gamut of the output device, and $C_{Core}$, which is a maximum chroma level (Cusp), are calculated based on the above stated equations using the calculated parameter k and boundary portions of the core gamut and the surround gamut of the output device are segmented using the calculated values. Then, gamut mapping is performed on the image data present inside the sRGB input color space and the image data present outside the sRGB color space and inside the scRGB color space to the core gamut and the surround gamut, respectively, in operation S310.

Meanwhile, the term 'unit' used in FIG. 1 is a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more CPUs in a communication system.

Figure 4:
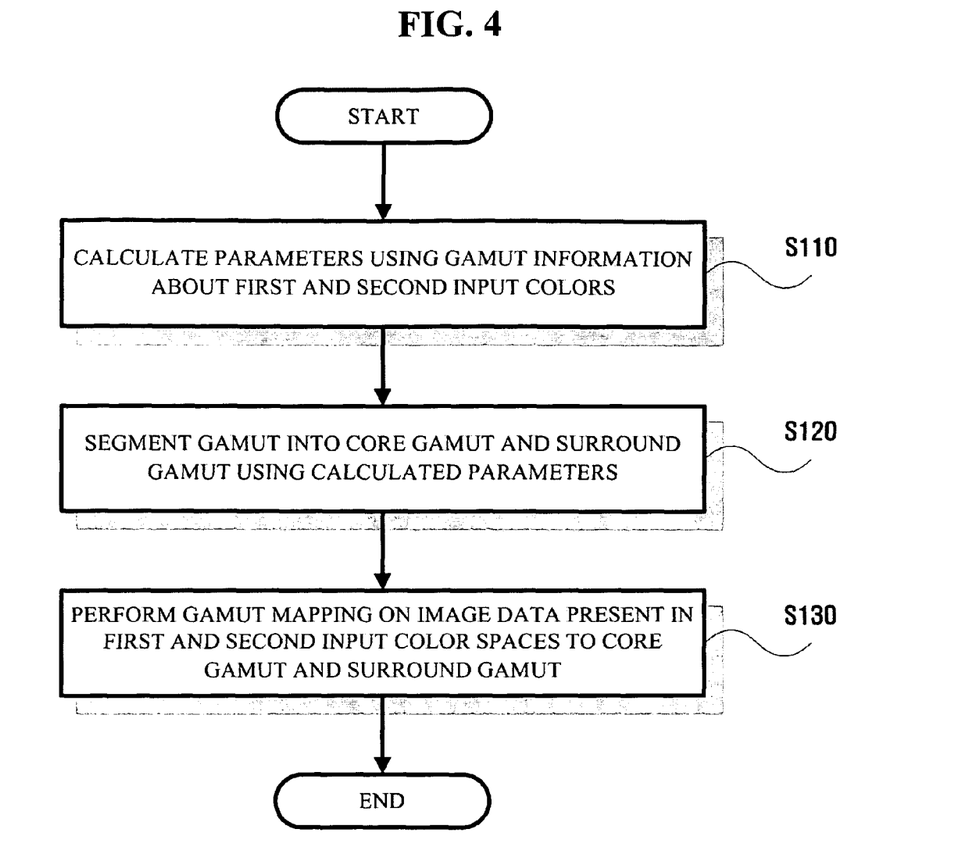
FIG. 4 is a flowchart of a gamut mapping method according to an exemplary embodiment of the present invention.

The overall flow of sequential steps of a gamut mapping method according to an exemplary embodiment of the present invention will be described with reference to FIG. 4. FIG. 4 is a flowchart of a gamut mapping method according to an exemplary embodiment of the present invention.

First, the parameter calculating unit 110 calculates parameters for segmenting a gamut of an output device using gamut information about the sRGB color and the scRGB color in operation S110. Steps of calculating the parameters α, β, and γ and the scaling factor k are the same as described in the first and second exemplary embodiments, respectively, and a detailed explanation thereabout will not be given.

Next, the gamut segmenting unit 120 segments the gamut of the output device into a core gamut and a surround gamut using the calculated parameters in operation S120, which is the same as described above, and a detailed explanation thereabout will not be given.

Finally, the gamut mapping unit 130 performs gamut mapping on the input image data to the core gamut and the surround gamut in operation S130. In other words, gamut mapping is performed on the input image data present inside the sRGB color space to the core gamut. In addition, the gamut mapping unit 130 performs gamut mapping on the image data present outside the sRGB color space and inside the scRGB color space to the surround gamut.

If all of input image data values fall in the sRGB color space, since it is not necessary to segment the gamut of the output device, gamut mapping is performed by the gamut mapping unit 130 without intervention of the gamut segmenting unit 120.

Meanwhile, as stated above, the gamut mapping is performed such that input image data of a wide gamut is reproduced as image data of a narrow gamut. Accordingly, gamut mapping is preferably performed by clipping or compression.

The above-described embodiments of the present invention can be applied to a hardcopy output device such as a color laser printer, a photo printer, an inkjet printer, or a multi-functional printer (MFP), a softcopy output device such as PDP, LCD, or a mobile display device, or the like.

It will no doubt be appreciated by one skilled in the art that the gamut mapping apparatus according to the exemplary embodiment of the present invention can be accomplished through a recording medium having a computer readable program recorded therein, the program for executing the gamut mapping method.

According to the present invention, input image data of a wide gamut, e.g., image data of the scRGB color space, can be reproduced as image data of a narrow gamut of an output device without distortion. In addition, the present invention enables accurate reproduction of image data having components having undergone total internal reflection falling outside the scRGB color space or high chroma components in the scRGB color space.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A gamut mapping apparatus comprising:
a parameter calculating unit for calculating parameters for segmenting a gamut of an output device using gamut information about first and second input color spaces;
a gamut segmenting unit for segmenting the gamut of the output device into a core gamut and a surround gamut using the parameters; and
a gamut mapping unit for performing gamut mapping on image data present in the first and second input color spaces to the core gamut and the surround gamut according to a predetermined mapping method,
wherein the parameters are calculated using maximum lightness levels, a minimum lightness levels and maximum chroma levels in the first input color space and the second input color space.

2. The gamut mapping apparatus of claim 1, wherein the first input color space is a sRGB color space and the second input color space is a scRGB color space.

3. The gamut mapping apparatus of claim 2, wherein the parameters are calculated using a ratio of the gamut distribution profile in the scRGB color space to the gamut distribution profile in the sRGB color space.

4. The gamut mapping apparatus of claim 3, wherein when the first input color space completely falls within the second input color space, the parameters α, β, and γ are defined by Equations $$\alpha = \frac{W_2 - W_{sRGB}}{W_2 - K_2}, \beta = \frac{K_{sRGB} - K_2}{W_2 - K_2}, \text{ and } \gamma = \frac{C_{sRGB}}{C_2},$$

wherein $W_2$, and $K_2$ denote a maximum lightness level and a minimum lightness level in the second input color space, $W_{sRGB}$ and $K_{sRGB}$ denote a maximum lightness level and a minimum lightness level in the gamut of the first input color space, $C_2$ denotes a maximum chroma level in the second input color space, and $C_{sRGB}$ denotes a maximum chroma level in the gamut of the first input color space, respectively.

5. The gamut mapping apparatus of claim 4, wherein the gamut segmenting unit segments the gamut of the output device into a core gamut and a surround gamut based on Equations $W_{Core}=W_{Surround}-\alpha k_1(W_{Surround}-K_{Surround})$, $K_{Core}=K_{Surround}+\beta k_2(W_{Surround}-K_{Surround})$ and $C_{Core}=\gamma k_3 C_{Surround}$, wherein $W_{Core}$, $K_{Core}$, and $C_{Core}$ indicate the maximum lightness level (white), the minimum lightness level (black), and the maximum chroma level in the core gamut of the output device, respectively, $W_{surround}$, $K_{surround}$, and $C_{surround}$ indicate the maximum lightness level (white), the minimum lightness level (black), and the maximum chroma level in the gamut in the surround gamut of the output device, and $k_1$, $k_2$, and $k_3$ are scaling factors, respectively.

6. The gamut mapping apparatus of claim 5, wherein the predetermined mapping method is performed such that image data present inside the first color space is mapped to the core gamut and image data present outside the first color space and inside the second color space is mapped to the surround gamut.

7. The gamut mapping apparatus of claim 1, wherein when the input image data falls in the first input color space, the gamut segmenting unit sets the core gamut and the surround gamut of the output device to be matched to each other, and the gamut mapping unit performs gamut mapping on the input image data to the core gamut or the surround gamut of the output device.

8. A color mapping method comprising:
calculating parameters for segmenting a gamut of an output device using gamut information about first and second input color spaces;
segmenting the gamut of the output device into a core gamut and a surround gamut using the parameters; and
performing gamut mapping on image data present in the first and second input color spaces to the core gamut and the surround gamut according to a predetermined mapping method,
wherein the parameters are calculated using maximum lightness levels, a minimum lightness levels and maximum chroma levels in the first input color space and the second input color space.

9. The color mapping method of claim 8, wherein the first input color space is a sRGB color space and the second input color space is a scRGB color space.

10. The gamut mapping method of claim 9, wherein the parameters are calculated using a ratio of the gamut distribution profile in the scRGB color space to the gamut distribution profile in the scRGB color space.

11. The gamut mapping method of claim 10, wherein when the first input color space completely falls within the second input color space, the parameters α, β, and γ are defined by Equations $$\alpha = \frac{W_2 - W_{sRGB}}{W_2 - K_2}, \beta = \frac{K_{sRGB}K_2}{W_2 - K_2}, \text{ and } \gamma = \frac{C_{sRGB}}{C_2},$$

wherein $W_2$, and $K_2$ denote a maximum lightness level and a minimum lightness level in the second input color space, $W_{sRGB}$ and $K_{sRGB}$ denote a maximum lightness level and a minimum lightness level in the gamut of the first input color space, $C_2$ denotes a maximum chroma level in the second input color space, and $C_{sRGB}$ denotes a maximum chroma level in the gamut of the first input color space, respectively.

12. The gamut mapping method of claim 11, wherein the segmenting of the gamut of the output device comprises segmenting the gamut based on Equations $W_{Core}=W_{Surround}-\alpha k_1(W_{Surround}-K_{Surround})$, $K_{Core}=K_{Surround}+\beta k_2(W_{Surround}-K_{Surround})$ and $C_{Core}=\gamma k_3 C_{Surround}$, wherein $W_{Core}$, $K_{Core}$, and $C_{Core}$ indicate the maximum lightness level (white), the minimum lightness level (black), and the maximum chroma level in the core gamut of the output device, respectively, $W_{surround}$, $K_{surround}$, and $C_{surround}$ indicate the maximum lightness level (white), the minimum lightness level (black), and the maximum chroma level in the gamut in the surround gamut of the output device, and $k_1$, $k_2$, and $k_3$ are scaling factors, respectively.

13. The gamut mapping method of claim 12, wherein the predetermined mapping method is performed such that image data present inside the first color space is mapped to the core gamut and image data present outside the first color space and inside the second color space is mapped to the surround gamut.

14. The gamut mapping method of claim 13, wherein the gamut mapping is performed by compression or clipping.

15. The gamut mapping method of claim 8, wherein when the input image data falls in the first input color space, the segmenting of the gamut comprises setting the core gamut and the surround gamut of the output device to be matched to each other, and the mapping of the gamut comprises performing gamut mapping on the input image data to the core gamut or the surround gamut of the output device.

16. A non-transitory computer-readable recording medium having a computer readable program recorded therein, the program for executing the method of claim 8.

* * * * *